UNITED STATES PATENT OFFICE.

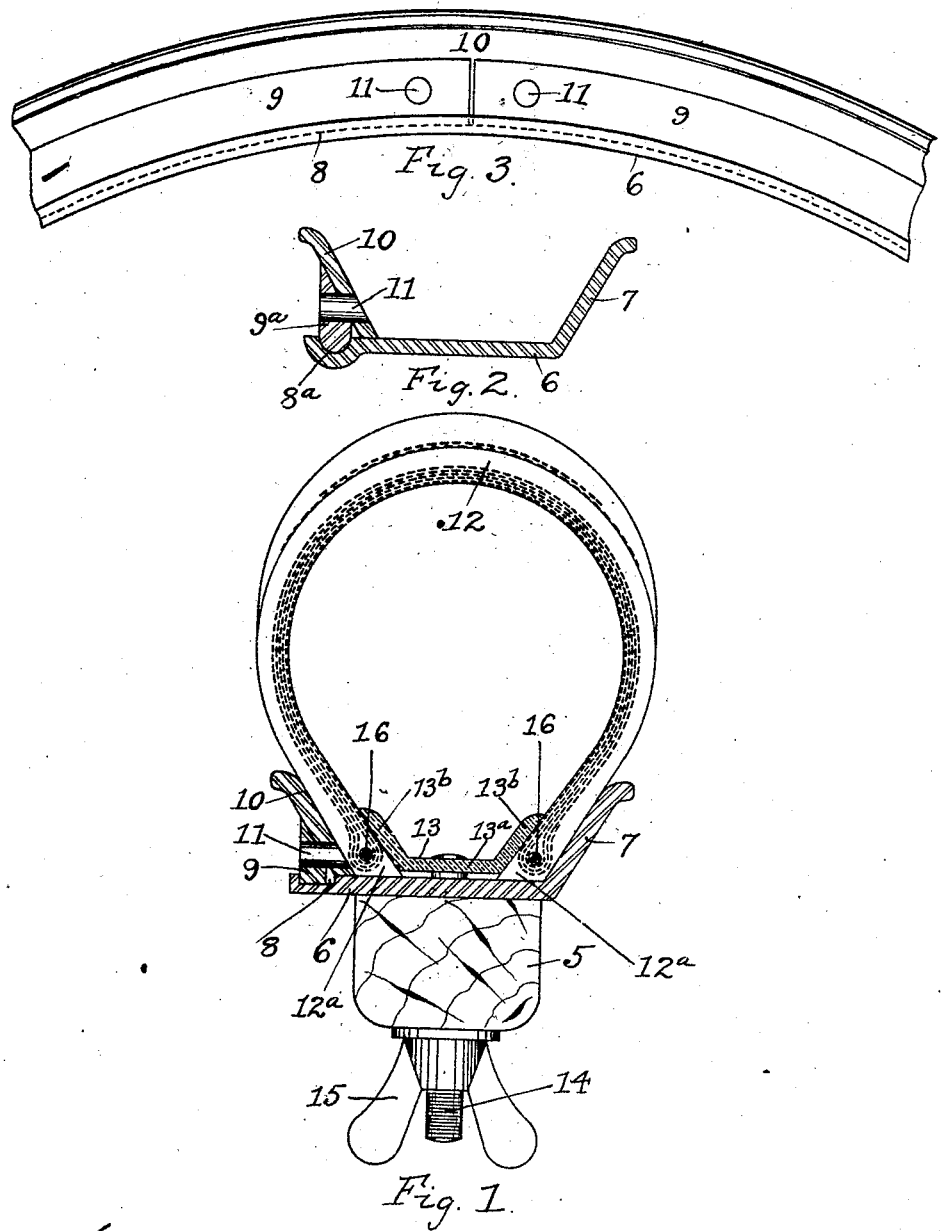

PERCY B. BOSWORTH, OF AKRON, OHIO, ASSIGNOR TO FIRESTONE TIRE & RUBBER COMPANY, OF AKRON, OHIO, A CORPORATION OF WEST VIRGINIA.

VEHICLE-TIRE.

977,585.     Specification of Letters Patent.     Patented Dec. 6, 1910.

Application filed June 9, 1906. Serial No. 320,984.

*To all whom it may concern:*

Be it known that I, PERCY B. BOSWORTH, a citizen of the United States, residing at Akron, in the county of Summit and State of Ohio, have invented certain new and useful Improvements in Fastening Means for Vehicle-Tires, of which the following is a specification.

This invention relates to vehicle tires, and more particularly to inflatable tires; and has reference more particularly to a novel means for detachably securing the tire to the rim.

The object of the invention is to provide an improved device for securely holding the tire to the rim and at the same time permitting easy removal thereof when the tire has been deflated.

The invention consists of the matters hereinafter described and claimed, and will be readily understood when considered in connection with the accompanying drawings, wherein,—

Figure 1 is a cross-sectional view through the tire, rim and felly; Fig. 2 is a similar view through the rim, showing a slightly modified form of retaining ring; and Fig. 3 is a side elevational view of a portion of the rim.

Referring to the drawings, 5 may designate the usual felly, and 6 the base member of a channel rim, which base member is preferably formed with one integral side flange 7, and has formed in its other side a groove 8. In this groove is seated a retaining ring 9, which is severed at one point to enable its convenient application to the rim-base. Inwardly of the retaining ring is a flange-member 10 corresponding to the opposite side flange, the inner edge of this flange-member seating on the rim-base inwardly of the groove 8. Pins 11 carried by either the retaining ring 9 or the detachable flange 10 are adapted to slidingly engage registering apertures in the other member.

12 designates the tire proper, the same being of the internally divided or split construction, the inner edges 12ª of which rest upon the rim-base 6.

13 designates an internal clamp-ring made in two or more sections, the same having an intermediate apertured portion 13ª adapted to be engaged and drawn toward the rim-base 6 by a series of bolts 14 passed through said apertures and through registering apertures in the rim-base 6 and felly 5 and tightened by wing-nuts 15; said clamp-ring also having inclined flanges 13ᵇ, between which and the rim flanges 7 and 10 the inner edges of the tire are clamped and securely held.

In the form of tire herein shown, the inner edges of the tire are shown as provided with internal retaining wires 16, but the use of such wires is optional and forms no part of the present invention.

In operation, when the tire is deflated, the clamp-ring 13 can be loosened by unscrewing the wing-nuts 15, and the flange 10 can be pushed in, thus disengaging the same from the retaining ring 9, and permitting immediate removal. The tire is applied by the converse of these operations, the flange 10 and retaining ring 9 being first united through the pins 11, and the clamp-ring 13 being then drawn down into place by the wing-nuts 15.

In the modification shown in Fig. 2, the groove 8ª is semi-circular and concave in cross-section, instead of square, as shown in Fig. 1; and the inner edge of the retaining ring 9ª is correspondingly rounded or convexed, as shown, to fit and seat in the concave groove; but the square construction of Fig. 1 is preferred, especially when the groove 8 is made slightly wider than the retaining ring, as shown, which facilitates the connection of the retaining ring and flange through the pins 11, where the latter are carried by one of said parts and engage registering apertures in the other.

As a specific improvement I prefer to form the retaining ring 9, of steel and to make it of a length corresponding to the circumference of the base of the groove in the rim. In applying the retaining ring, it may be sprung sufficiently to enable it to pass over the side wall of the groove and when entered in the groove it will contract so as to fit closely within the groove and by its hugging relation therewith prevent its easy displacement.

I claim:

1. The combination with a rim having a removable side flange and provided in its base with an annular groove lying outside of said removable flange, of an elastic retaining ring transversely severed at one point adapted to be sprung into said groove in the base and to abut against the outer side of said removable flange, and fastening pins passed through said retaining ring and side flange near the meeting ends of the former, substantially as described.

2. The combination with a rim having a removable side flange and provided in its base with an annular groove lying outside of said removable flange, of a hollow tire-body seated in said rim, an elastic retaining ring transversely severed at one point adapted to be sprung into said groove in the base and to abut against the outer side of said removable flange, fastening pins passed through said retaining ring and side-flange near the meeting ends of the former, a clamp-ring disposed internally of the tire-body and engaging the side walls of the latter, and means for drawing said clamp-ring toward the rim base, substantially as described.

3. The combination of a vehicle wheel rim having a depressed groove near its detaching edge, an inextensible rim flange sliding over the groove onto the rim, a contractible locking ring sprung into the groove, and engaging pin and aperture means connecting the rim flange and locking ring, substantially as described.

4. The combination of a vehicle wheel rim having a depressed groove near its detaching edge, an inextensible rim flange sliding over the groove onto the rim, a split locking ring sprung into the groove, and engaging pins and apertures connecting the locking ring and the rim flange, to hold the locking ring in the groove, substantially as described.

5. The combination of a vehicle wheel rim having a depressed groove near its detaching edge, a rim flange slidable over the groove onto the rim, a split locking ring sprung into the groove, and engaging pins and apertures connecting the locking ring and the rim flange, to hold the locking ring in the groove, substantially as described.

6. The combination of a vehicle wheel rim, a rim flange detachably mounted on said rim, a split locking-ring coöperating with said rim flange to hold the same in operative position on the wheel rim, and engaging pins and apertures connecting the locking-ring and the rim flange to hold the former against expansion, substantially as described.

7. The combination of a vehicle wheel rim having a depressed groove near its detaching edge, a rim flange adapted to slide over the groove on to the rim, a split locking ring adapted to be sprung into the groove to retain the flange on the rim, pin and aperture means between and coöperating with said flange and ring and adapted to prevent expansion of the latter and hold the ring in the groove, and a tire spreader adjacent to said means and adapted by preventing inward displacement of the flange from permitting the pins leaving their apertures, substantially as described.

PERCY B. BOSWORTH.

Witnesses:
J. H. ADAMS,
C. P. KENNEDY.